United States Patent Office 3,235,521
Patented Feb. 15, 1966

3,235,521
VINYL RESIN COMPOSITION CONTAINING COATED PARTICULATE BARIUM SILICATE
Adrian R. Pitrot, Uniondale, N.Y., and John G. Hendricks, Boonton, N.J., assignors to National Lead Company, New York, N.Y., a corporation of New Jersey
No Drawing. Filed Aug. 5, 1960, Ser. No. 47,594
16 Claims. (Cl. 260—23)

This invention relates to improved vinyl resin compositions.

In particular this invention relates to new compositions useful as additives for such compositions.

It is common knowledge that vinyl resins require the addition of stabilizing agents to retard degradation by the action of heat and/or light. Other additives are also commonly used, depending on the end use for which the resin composition is intended. For example, plasticizers, coloring agents, fillers, pigments, lubricants and the like may be incorporated for various reasons. These additives may be incorporated into the resin batch by milling on heated rolls. Further heat processing frequently required in order to place the resin composition in the physical form required, for example molding, calendering, extrusion, stamping and like operations.

A vexing difficulty commonly experienced in such heat-processing operations is know as "plating," that is, the tendency for the resin composition, or some components thereof, to adhere to the processing equipment surfaces in the form of a thin, strongly-adherent coating. This is undesirable even when a single, uniform resin stock is being processed, and requires a cleanout operation every time the resin stock is changed. This is particularly necessary when colored plastics are being processed and it is desired to change to a different-colored stock. "Plating," at least in some instances, is considered to be associated with poor compatibility of the various components of the resin composition.

Other difficulties also occur in many cases, that may be related to compatibility of the components of the resin composition. Among these may be mentioned hazing, spewing, and unctuousness.

While the vinyl art has been suggestive of numerous resin system and special expedients for controlling particular conditions, no satisfactory general solution to these problems have heretofore been proposed. The most effective and generally satisfactory of the addition agents heretofore proposed is a lead orthosilicate composition. While this type additive is largely successful in overcoming the disadvantages mentioned above, it suffered from the disadvantage, attributable to its lead content, of being subject to sulfide staining.

It is, therefore, an object of this invention to provide new additive compositions which will improve vinyl resins. It is a further object to provide resin systems with improved plating resistance. Another object is to provide vinyl resin compositions having improved resistance to the effects of inadequate compatibility of various resin additives. Yet another object is to provide a process for making said useful additive compositions. A still further object is to provide new compositions readily dispersible in vinyl resins. Another object is to achieve the above ends without introduction of compounds subject to sulfide staining. Other objects and advantages will become apparent from the following more complete description and claims.

Broadly, this invention contemplates, as a new composition of matter, barium silicate in the form of particles, said particles being coated with an alkaline earth salt of a fatty acid containing from 6 to 24 carbon atoms.

This invention also contemplates a vinyl halide resin composition containing barium silicate in the form of particles, said particles being coated with an alkaline earth salt of a fatty acid containing from 6 to 24 carbon atoms.

In addition, this invention contemplates a method for making a barium silicate-alkaline earth soap composition, which comprises the steps of preparing barium silicate in an aqueous medium, adding thereto an alkaline earth salt of a fatty acid containing from 6 to 24 carbon atoms, and removing said aqueous medium.

This invention is based upon the discovery that barium silicate, when coated with an alkaline earth soap as herein described, markedly improves plating resistance and minimizes the effects of inadequate compatibility of resin additives. In addition, the compositions of this invention also decrease the change of color due to exposure of the plastic to heat and, in contrast to many other resin addition agents, do not stain plastic products exposed to atmospheres or materials containing sulfides.

The mechanism by which the materials of this invention produce these beneficial effects is not fully understood; however, it has been observed that the addition of a coating to the barium silicate, according to this invention, results in easier grinding and in a reduced tendency for the ground material to reagglomerate, and the resulting improved dispersion of the barium silicate may be responsible, at least in part, for its unusual effectiveness in overcoming plating, unctuousness and the other difficulties mentioned above. At any rate, it has been found that coated barium silicate according to this invention, is markedly more effective than barium silicate prepared in the same manner but left uncoated.

The resins to which this invention is applicable are vinyl halide resins, this term being used to include the various vinyl resin compounds and combinations known to the art such as, vinyl halide polymers; vinyl resins produced by conjointly polymerizing a vinyl halide resin with vinyl acetate or other vinyl ester, or with vinylidene halide; vinyl resin copolymers with acrylic compounds as for instance, ethyl methacrylate or methyl methacrylate; and also vinylidine chloride polymer. The vinyl halide currently preferred is the chloride; however, others such as the bromide or fluoride may also be used.

Any of the currently-used stabilizers may be used in the resin compositions according to this invention. Representative examples include lead salts (where sulfide staining is not a problem), such as lead phthalates, silicates, stearates, basic sulfates, basic phosphites and the like, alkaline earth soaps, particularly those of barium, such as barium stearate, barium caprate and the like, cadmium soaps and salts, fatty acid soaps of zinc and tin, and organometallic stabilizers such as dibutyltin dilaurate and dibutyltin maleate.

These stabilizers may be used alone or in admixtures with each other. As alluded to previously, resin compositions stabilized with mixtures of the barium, cadmium or zinc type stabilizers are particularly improved as regards plating, by the products of this invention.

Any of the plasticizers conventionally employed in vinyl resins may be used in conjunction with the stabilizers of this invention. These plasticizers generally are selected from the following groups:

Organic esters: Phthalates, adipates, azelates, sebacates; aryl, aryl-alkyl or alkyl phosphates; organic ester epoxides; ether esters such as polyethylene glycol esters, etc.; aliphatic unsaturated esters including unsaturated oil derivatives; polyesters and other polymeric plasticizers; chlorinated paraffins and aromatics; and miscellaneous groups as hydrocarbons, nitriles, amides, sulfur-containing materials etc.

These plasticizers may be used alone; however, it is the common practice to use combinations.

The silicates applicable in the preparation of the novel product are any commercial water soluble silicates such as, for instance, sodium or potassium silicate.

The coating material employed according to this invention is an alkaline earth soap of a fatty acid having from 6 to 24 carbon atoms. Among such materials may be mentioned particularly the barium soaps, which are preferred, such as barium caprate, caproate, caprylate, aurate, myristate, oleate, stearate, linoleate, linolenate, behenate and the like. Also operable, although not preferred, are the corresponding soaps of calcium, strontium and magnesium. All of these materials are insoluble solids of a polar-nonpolar nature, which adhere tenaciously to the surface of the barium silicate particle and render it organophilic, as well as shielding the surface sufficiently to inhibit agglomeration of adjacent particles.

In a preferred mode of operation according to this invention, the coating agent is a barium soap, but it is formed in situ rather than being added as such, by coating the barium silicate with a suitable organic acid, which then reacts with the barium silicate at the surface of the particle to produce a coating of barium soap.

The barium silicate may be prepared by a double decomposition reaction using a soluble silicate and a soluble barium salt, such as barium salt being present in amount equivalent to the anion of the silicate. It is preferred to make and use a hydrated barium silicate having a barium to silica molar ratio between $BaO:2SiO_2$ and $BaO:4SiO_2$.

The precipitated hydrated barium silicate is subsequently washed to remove alkali salts and other impurities and repulped to a workable water slurry. To this slurry an emulsion of an applicable organic acid or alkaline earth metal soap is added resulting thereby in a coating on the barium silicate.

In a particularly desirable embodiment, where the coating material is an acid, the coating emulsion contains a plasticizer of the ether-ester type, examples of which are triethylene glycol di-2-ethylhexoate, triethylene glycol dicaprate, and triethylene glycol dilaurate. The latter is readily available in sufficiently pure form, in the form of a triethylene glycol ester of coconut oil fatty acids.

The water-organic liquid emulsion may be accomplished by known means, as by using a colloid mill, high speed agitator or the like. To facilitate emulsification, is usually desirable, but not necessary, to add a small amount of a suitable wetting agent, such as morpholine or triethanolamine.

The removal of water from the combined mixture of barium silicate-water slurry, and organic liquid-water emulsion may be accomplished in various ways, for example, by evaporation or the like. It is most convenient, however, to agitate the mixture for a short period, assuring completion of the reaction, and then filter and dry.

For best results, it is preferred to operate in such a way that the coating will be 0.25 to 10% by weight of the hydrated barium silicate. Smaller amounts are ineffective to produce the desired results, while larger amounts of coating add needlessly to the cost of the composition, without producing any further advantages.

Where the plasticizer is employed in conjunction with the alkaline earth soap to produce a combined coating, the plasticizer should be present in amount between 1 and 10 parts for each part by weight of alkaline earth soap because less than 1 part is ineffective to achieve the desired results, while amounts in excess of 10 parts do not contribute any additional improvement, and tend to make the material excessively wet.

The combined coated product when incorporated into a vinyl halide resin composition yielded excellent dispersion characteristics heretofore not attained with uncoated barium silicate and in addition, plating resistance, heat stability, clarity and resistance of the vinyl composition to initial yellow discoloration were appreciably improved.

As to proportions, the amount of barium silicate may vary substantially in the polymer compositions; as little as 0.1% produces an appreciable beneficial effect and amounts as high as 25% are effective. It is preferred, however, to add between 0.25 and 4%.

The other resin additives are used in amounts that are conventional in the formulation of vinyl resins. Suitable, representative proportions are 0.5 to 10% of the stabilizer and 30 to 60% of the plasticizer, all proportions, except as otherwise indicated being percent by weight of the vinyl halide resin.

In order to illustrate more clearly the nature of the present invention and the manner of practising the same, the following examples are presented.

*Example 1*

36.39 pounds of sodium silicate were dissolved in 13 gallons of water and the volume diluted to a total of 16 gallons.

33.33 pounds of hydrochloric acid (37% aqueous solution) were reacted with 33.33 pounds of barium carbonate suspended in 12 gallons of water, and the mixture was diluted to a total of 16 gallons.

Both of the solutions were then added simultaneously and at equal rates over a 2-hour period to 64 gallons of water, using vigorous agitation. After the addition was complete, the resultant slurry was agitated for an additional 40 minutes.

The slurry was then filtered on a rotary filter, washed by repulping in 64 gallons of water, and again filtered. The washing step was repeated three more times, until the conductivity of the slurry had reached a constant value, and the indication of chlorides in the filtrate was slight.

One-half of the washed cake was dried at 220° F. for 23 hours, and an 8-pound sample of the dried product was ground and reserved as a control.

The second half of the filter cake at 29% solids, containing 18.56 pounds of solids on a dry basis, was slurried in 17 gallons of water and stearated. 0.185 pound of stearic acid was dissolved in 0.37 pound of hot triethylene glycol dilaurate. 0.62 pound of triethanolamine dissolved in 6.5 pounds of water at 170° F. was added to the hot stearic acid solution to form an emulsion. The emulsion was then added to the barium silicate slurry over a 20 minute period with good agitation. The treated slurry was then filtered and dried, and an 8-pound sample was ground in the same manner as the control sample. It was observed that the treated sample offered somewhat better grinding properties than the untreated control. The resulting stearated barium silicate had a barium stearate content of 1.25% and a triethylene glycol dilaurate content of 2%. The triethanolamine was removed in the filtrate. The treated sample and the untreated control were tested for dispersion, plating resistance, heat stabilization, and yellowing as follows:

To determine the dispersion characteristics, a formulation of 100 parts of polyvinylchloride resin, 50 parts of DOP and 0.2 part of phthalocyanine green (used as a contrasting background) is prepared in sufficient quantity so as to provide a master batch in which various materials under test may be evaluated. To 225 grams of this master batch, 7.5 grams of the material under test is added. The ingredients are blended well and then added to a two-roll mill having a temperature of 300° F. After three minutes of milling, a 12 mil film, having dimensions of 10" x 14", is removed. This film is then examined as to the number of small spots (4–8 mils), medium spots (8–12 mils) and large spots (over 12 mils). The dispersion rating is based on the number and size of the undispersed particles.

Plating resistance is evaluated by first preparing a test stock with the following formulation: 100 parts of polyvinylchloride resin, 37 parts of DOP, 3 parts of an epoxy plasticizer, 6 parts of a 50% Watchung-red DOP paste, 2 parts of a commercial barium-cadmium stabilizer and 1 part of the material to be tested. By epoxy plasticizer we mean organic epoxides and specifically in this formulation epoxidized soy bean oil. DOP is di 2-ethylhexyl phthalate. This formulation is blended and added to a two-roll mill at 300° F. for 10 minutes. The plastic formulation is then removed from the mill. A clean-up stock, having the following formulation: 100 parts of polyvinylchloride resin, 25 parts of DOP, 1 part of dibutyl tin dilaurate, 1 part $TiO_2$ and 10 parts hydrated alumina, is placed on the mill for 10 minutes at 300° F., after said time a 12 mil sheet is removed. The clean-up stock is then examined for intensity of the pink or red color. Stabilizers having low plate-out will have a light pink color on the clean-up stock, whereas a deep red color indicates poor plate-out characteristics.

Heat stability and yellowing are evaluated by preparing a plastic composition having the following formulation: 100 parts of polyvinylchloride resin, 40 parts of DOP, 3 parts of epoxy plasticizer, 0.5 part of stearic acid, 2.0 parts of a commercial barium-cadmium stabilizer and 1.0 part of the test material. The compositions are weighed, mixed, heated on a two-roll mill at a temperature of 315° F. and milled for 3 minutes until substantially uniform. The composition is then sheeted into a 40 mil stock and evaluated in a forced draft oven at 400° F. Samples of the composition are then removed at appropriate intervals.

The stearated barium silicate according to this invention was found to have an excellent dispersion rating, whereas the uncoated material was deficient and unacceptable in this respect. The resistance of the resin composition to plating was appreciably improved by the addition of stearated, as compared to uncoated barium silicate, as was the heat stability. No significant difference was observed as to yellowing of the composition.

*Example 2*

364 grams of barium hydroxide octahydrate, $$Ba(OH)_2 \cdot 8H_2O$$

were placed in a 10-liter vessel with 6 liters of water and heated to 40° C. Sodium silicate, 699 grams, was diluted with an equal volume of water (approximately 400 ml.), and added to the barium hydroxide as follows:

First 15 minutes—75 ml.
Second 15 minutes—225 ml.
Third 15 minutes—Remainder. (Total volume, approximately 800 ml.)

The barium silicate precipitated to form a slurry which was stirred for 1 hour. After this time, the batch was filtered and washed with 2 liters of water.

A portion of the washed filter cake weighing approximately 1 pound was repulped and filtered twice using 1½ liter of water for each repulping, and the filter cake was washed each time with an additional 500 ml. of water. The cake was then dried and reserved as a control.

To another one-pound portion of the original washed barium silicate filter cake was added 1% of its weight (dry solids basis) of stearic acid dissolved in 35 ml. of 1 N sodium hydroxide. The mixture was stirred for about one-half hour and then filtered. The filter cake was repulped twice with 1 liter of water each time, and filtered and washed each time with 500 ml. of water. The final cake was then oven-dried at 91–93° C., in the same manner as the control. The final stearated product had a barium stearate content of 1.2%.

Both the control and the stearated sample were Raymond milled using an 0.020-inch screen.

The two samples were evaluated comparatively for dispersion properties according to the method described in Example 1. The stearated sample was found to have decidedly better dispersion properties than the unstearated control.

*Example 3*

306.5 grams of barium chloride dihydrate, $$BaCl_2 \cdot 2H_2O$$

were dissolved in 800–900 ml. of water, transferred to a one-liter volumetric flask and made up to mark. 272.8 grams of sodium silicate (55 $SiO_2$) were dissolved in 800–900 ml. of water, filtered through fritted glass, transferred to a one-liter volumetric flask and made up to mark. Five liters of water were placed in a 10 x 10 inch jar and with vigorous agitation, the barium chloride and sodium silicate solutions were added simultaneously and uniformly over a period of two hours. When the addition was complete, the slurry was transferred to a 24 cm. Buchner funnel, filtered and repulped four times using six liters of water for each repulping. The chloride content was found to be very low after the final washing.

Approximately one-third of the washed filter cake was repulped with two liters of water and treated with an emulsion of 20 grams of triethylene glycol dilaurate and 10 grams of stearic acid in 300 ml. of water and 3.4 grams of triethanolamine. The slurry was then filtered, dried and milled. The resulting product was designated portion 1.

A second portion, also amounting to approximately one-third of the washed barium silicate filter cake, was handled in the same manner, except that only 13.4 grams of triethylene glycol dilaurate, 6.6 grams of stearic acid, 200 ml. of water and 2.2 grams of triethanolamine were used. The resulting product was designated portion 2.

The remaining third of the washed barium silicate filter cake was handled in the same way, except that in this case the treating emulsion consisted of 10 grams of triethylene glycol dilaurate and 5.0 grams of stearic acid in 150 ml. of water and 1.7 grams of triethanolamine. The product was designated portion 3.

The three samples were tested for heat stabilization, yellowing and dispersion as described in Example 1.

Portion 3 had the best heat stabilization properties, followed by portion 2, portion 1, and a comparable commercially-acceptable standard formulation, made up in the same manner, but without any coating of triethylene glycol dilaurate and barium stearate.

The initial yellowing, corresponding to the slight off-color frequently developed during hot fabrication of vinyl resin products, was least noticeable in portions 2 and 3, slightly more so in portion 1, but still less in portion 1 than in the control.

The clarity of the test stocks containing all three experimental samples was about equal, and appreciably better than that of the control.

The dispersion characteristics of the experimental samples were all decidedly better than the control.

*Example 4*

The procedure of Example 3 was repeated, except that instead of dividing the washed barium silicate in three portions and subsequently treating with stearic acid and ethylene glycol dilaurate, the cake was divided in two portions. One portion was dried without any addition agent and reserved as a control. The other portion was treated in the same manner described in Example 3 with stearic acid in amount equal to one part by weight for each hundred parts of barium silicate, and ethylene glycol dilauratae in amount equal to 2 parts by weight for each hundred parts of barium silicate.

When incorporated into a vinyl resin composition as described in Example 1, both the experimental sample and the control showed very good plating resistance, very good and approximately equal clarity, and good dispersion. The resin composition made with the treated barium silicate, however, showed appreciably better heat stability.

Example 5

The procedure of Example 3 was employed to make caprated barium silicate by employing an emulsion of capric acid in aqueous triethanolamine in place of the emulsion of stearic acid, triethylene glycol dilaurate and triethanolamine. The capric acid was added in amount equal to one part by weight for each 100 parts by weight of barium silicate present. The resulting product had heat stability and plating resistance equal to a comparable stearated barium silicate composition, and an excellent dispersion rating.

Although the invention has been described with particular reference to the use of barium stearate as the coating material, the results obtained are similar to those using soaps of calcium, magnesium and strontium. These materials may be applied to the particle surfaces in the same manner as barium stearate, by substituting a water suspension of the desired soap in place of the stearic acid emulsion. By the same token, barium stearate or other barium soap may be applied as a water suspension of the soap rather than being formed in situ by the use of a stearic acid emulsion. As a matter of convenience, however, it is preferred to use the acid when a barium soap coating is desired.

Similarly, in place of stearic acid or capric acid, one may use the other fatty acids in the 6–24 carbon atom range, with similar results in all cases. The manipulative techniques are identical to those employed with stearic and capric acids.

While this invention has been described in terms of certain preferred embodiments and illustrated by way of specific examples, these are illustrative only, and the invention is not to be construed as limited, except as set forth in the appended claims.

What is claimed is:

1. As a new composition of matter, finely-divided hydrated barium silicate particles, said hydrated barium silicate having a barium to silica molar ratio between $BaO:2SiO_2$ and $BaO:4SiO_2$, said particles being coated with an alkaline earth metal salt of a fatty acid containing from 6 to 24 carbon atoms, said coating present from 0.25% to 10% by weight of said hydrated barium silicate.

2. As a new composition of matter, finely-divided hydrated barium silicate particles, said hydrated barium silicate having a barium to silica molar ratio between $BaO:2SiO_2$ and $BaO:4SiO_2$, said particles being coated with a barium salt of a fatty acid containing from 6 to 24 carbon atoms, said coating present from 0.25% to 10% by weight of said hydrated barium silicate.

3. As a new composition of matter, finely-divided hydrated barium silicate particles, said hydrated barium silicate having a barium to silica molar ratio between $BaO:2SiO_2$ and $BaO:4SiO_2$, said particles being coated with an alkaline earth metal salt of stearic acid, said coating present from 0.25% to 10% by weight of said hydrated barium silicate.

4. As a new composition of matter, finely-divided hydrated barium silicate particles, said hydrated barium silicate having a barium to silica molar ratio between $BaO:2SiO_2$ and $BaO:4SiO_2$, said particles being coated with barium stearate, said coating present from 0.25% to 10% by weight of said hydrated barium silicate.

5. As a new composition of matter, finely-divided hydrated barium silicate particles, said particles being coated with a mixture of a plasticizer and an alkaline earth metal salt of a fatty acid containing from 6 to 24 carbon atoms, said plasticizer being an ethylene glycol ether diester, said coating present from 0.25% to 10% by weight of said hydrated barium silicate.

6. Composition according to claim 5, in which said plasticizer is triethylene glycol dilaurate.

7. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with an alkaline earth metal salt of a fatty acid containing from 6 to 24 carbon atoms, said coating present from 0.25% to 10% by weight of said hydrated barium silicate, said coated particles present in said vinyl halide resin composition in an amount ranging from 0.1% to 25% by weight of said vinyl halide resin.

8. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with a barium salt of a fatty acid containing from 6 to 24 carbon atoms, said coating present from 0.25% to 10% by weight of said hydrated barium silicate, said coated particles present in said vinyl halide resin composition in an amount ranging from 0.1% to 25% by weight of said vinyl halide resin.

9. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with barium stearate, said coating present from 0.25% to 10% by weight of said hydrated barium silicate, said coated particles present in said vinyl halide resin composition in an amount ranging from 0.1% to 25% by weight of said vinyl halide resin.

10. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with a mixture of a plasticizer and an alkaline earth metal salt of a fatty acid containing from 6 to 24 carbon atoms, said plasticizer being an ethylene glycol ether diester, said coating present from 0.25% to 10% by weight of said hydrated barium silicate, said coated particles present in said vinyl halide resin composition in an amount ranging from 0.1% to 25% by weight of said vinyl halide resin.

11. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with an alkaline earth metal salt of a fatty acid containing from 6 to 24 carbon atoms and triethylene glycol dilaurate, said coating present from 0.25% to 10% by weight of said hydrated barium silicate, said coated particles present in said vinyl halide resin composition in an amount ranging from 0.1% to 25% by weight of said vinyl halide resin.

12. A vinyl halide resin composition containing a vinyl halide resin and finely-divided hydrated barium silicate particles, said hydrated barium silicate having a barium to silica molar ratio between $BaO:2SiO_2$ and $BaO:4SiO_2$, said particles being coated with barium stearate and triethylene glycol dilaurate, said coating present from 0.25% to 10% of said hydrated barium silicate, said coated particles present in said vinyl halide resin composition in an amount ranging from 0.1% to 25% by weight of said vinyl halide resin.

13. A method for making a coated hydrated barium silicate composition which comprises the steps of dispersing finely-divided hydrated barium silicate particles in an aqueous medium, said hydrated barium silicate having a barium to silica molar ratio between about $BaO:2SiO_2$ and about $BaO:4SiO_2$, adding to said barium silicate dispersion an aqueous suspension of a fatty acid having from 6 to 24 carbon atoms, reacting said fatty acid with said barium silicate and forming in situ on the surface of said barium silicate a barium salt of said fatty acid, said coating present from 0.25% to 10% by weight of said barium silicate, deliquoring and drying said coated composition.

14. A method for making a coated hydrated barium silicate composition which comprises the steps of dispersing finely-divided hydrated barium silicate particles in an aqueous medium, said hydrated barium silicate having a barium to silica molar ratio between about $BaO:2SiO_2$ and about $BaO:4SiO_2$, adding to said barium silicate dispersion an aqueous suspension of a fatty acid and an ethylene glycol ether diester, said fatty acid having from 6 to 24 carbon atoms, reacting said fatty acid with said barium silicate and forming in situ on the surface of said barium silicate a coating of a barium salt of said fatty acid and a coating of said ethylene glycol ether diester, said ethylene glycol ether diester present in amount between 1 and 10 parts for each part by weight of said barium salt of said fatty acid, said combined coating present from 0.25% to 10% by weight of said barium silicate, deliquoring and drying said coated composition.

15. A method for making a coated hydrated barium silicate composition which comprises the steps of dispersing finely-divided hydrated barium silicate particles in an aqueous medium, said hydrated barium silicate having a barium to silica molar ratio between about $BaO:2SiO_2$ and about $BaO:4SiO_2$, adding to said barium silicate an alkali salt of a fatty acid having from 6 to 24 carbon atoms, reacting said alkali salt with said barium silicate and forming in situ on the surface of said barium silicate a barium salt of a fatty acid, said coating present from 0.25% to 10% by weight of said barium silicate, deliquoring and drying said coated composition.

16. A method for making a coated hydrated barium silicate composition which comprises the steps of dispersing finely-divided hydrated barium silicate particles in an aqueous medium, said hydrated barium silicate having a barium to silica molar ratio between about $BaO:2SiO_2$ and about $BaO:4SiO_2$, adding to said barium silicate dispersion an alkali salt of a fatty acid having from 6 to 24 carbon atoms and an ethylene glycol ether diester, reacting said alkali salt with said barium silicate and forming in situ on the surface of said barium silicate a coating of a barium salt of said fatty acid and a coating of said ethylene glycol ether diester, said ethylene glycol ether diester present in amount between 1 and 10 parts for each part by weight of said barium salt of said fatty acid, said combined coating present from 0.25% to 10% by weight of said barium silicate, deliquoring and drying said coated composition.

References Cited by the Examiner

UNITED STATES PATENTS

| | | | |
|---|---|---|---|
| 1,832,416 | 11/1931 | O'Brien | 106—308 |
| 1,919,714 | 7/1933 | Endres | 106—308 |
| 2,179,973 | 11/1939 | Alexander | 260—45.75 |
| 2,367,629 | 1/1945 | Teppema et al. | 260—23 |
| 2,564,646 | 8/1951 | Leistner et al. | 260—45.85 |
| 2,663,695 | 12/1953 | Perloff et al. | 260—23 |
| 2,765,238 | 10/1956 | Allen | 106—308 |
| 2,929,733 | 3/1960 | Kebrich et al. | 106—308 |
| 2,980,643 | 4/1961 | Edelman et al. | 260—45.75 |

FOREIGN PATENTS 568,499   1/1959   Canada.

OTHER REFERENCES

Doolittle: "The Technology of Solvents and Plasticizers," 1954, pages 981 to 984.

LEON J. BERCOVITZ, *Primary Examiner.*

A. D. SULLIVAN, M. STERMAN, *Examiners.*